(12) United States Patent
Kawai (10) Patent No.: US 11,206,350 B2
(45) Date of Patent: Dec. 21, 2021

(54) IMAGE PROCESSING APPARATUS, IMAGE PICKUP APPARATUS, IMAGE PROCESSING METHOD, AND STORAGE MEDIUM

(71) Applicant: CANON KABUSHIKI KAISHA, Tokyo (JP)

(72) Inventor: Yusuke Kawai, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/115,556

(22) Filed: Dec. 8, 2020

(65) Prior Publication Data
US 2021/0195099 A1    Jun. 24, 2021

(30) Foreign Application Priority Data
Dec. 18, 2019   (JP) .............................. JP2019-228213

(51) Int. Cl.
  *H04N 5/232*    (2006.01)
  *H04N 5/262*    (2006.01)
  *G02B 7/28*     (2021.01)

(52) U.S. Cl.
  CPC ... *H04N 5/23229* (2013.01); *H04N 5/232125* (2018.08); *H04N 5/2621* (2013.01); *G02B 7/285* (2013.01)

(58) Field of Classification Search
  CPC ............ G02B 7/285; H04N 5/232125; H04N 5/23229; H04N 5/2621; H04N 5/232133
  See application file for complete search history.

(56) References Cited

U.S. PATENT DOCUMENTS

| | | | | |
|---|---|---|---|---|
| 10,009,533 | B2 * | 6/2018 | Kimura | ................. G02B 7/285 |
| 2001/0002216 | A1 * | 5/2001 | Chuang | .................... G06T 5/50 |
| | | | | 382/255 |
| 2009/0096897 | A1 * | 4/2009 | Saito | ................. H04N 5/23229 |
| | | | | 348/241 |
| 2018/0084192 | A1 * | 3/2018 | Suzuki | ............... H04N 5/23229 |
| 2018/0124318 | A1 * | 5/2018 | Koizumi | .......... H04N 5/232125 |

FOREIGN PATENT DOCUMENTS

JP     2015-216532 A    12/2015
JP     2018037857    *   8/2018   ............. H04N 5/232

* cited by examiner

*Primary Examiner* — Hung H Lam
(74) *Attorney, Agent, or Firm* — Canon U.S.A., Inc. IP Division (57) ABSTRACT

An apparatus executes the instructions to create a combined image by performing combining processing using a plurality of images of an object captured at different focus positions in an optical axis direction, and acquire contrast values of the plurality of images. A depth of field of the combined image is deeper than a depth of field of each of the plurality of images. The at least one processor further executes instructions to calculate a combining ratio used in the combining processing using the contrast values of the plurality of images. An image in which the object is not in focus among the plurality of images is determined using the contrast values of the plurality of images, and the determined image is not used in the combining processing.

19 Claims, 9 Drawing Sheets

IMAGE PROCESSING APPARATUS, IMAGE PICKUP APPARATUS, IMAGE PROCESSING METHOD, AND STORAGE MEDIUM

BACKGROUND OF THE DISCLOSURE

Field of the Disclosure

The aspect of the embodiments relates to an image processing apparatus, image pickup apparatus, image processing method, and storage medium, that combine a plurality of images captured at different focus positions in an optical axis direction.

Description of the Related Art

In a case where an image including a plurality of objects greatly varying in distances from a digital camera is captured, or in a case where an image of an object that is long in a depth direction is captured, some of or a part of the object(s) may be in focus because of an insufficient depth of field. To solve such an issue, Japanese Patent Laid-Open No. 2015-216532 discusses a so-called focus stacking technique. In the technique, a plurality of images varying in focus positions are captured, and in-focus regions are extracted from the respective images. The extracted regions are combined into one image to generate a combined image in which the entire captured region is in focus. Accordingly, in the technique discussed in Japanese Patent Laid-Open No. 2015-216532, a region having the highest contrast value among regions located at the same position in respective images is set as an in-focus region to be used in combining.

However, when images to be used in focus stacking are captured, an image in which no object is in focus, i.e., an image that is fully blurred (hereinafter referred to as a fully blurred image) can be captured. Since no object is in focus in the fully blurred image, it is desirable not to use the fully blurred image in generating a combined image. However, if a high-luminance region, a moving body region, or the like is present in the fully blurred image, the fully blurred image can be erroneously used in the combined image.

Figure 10:
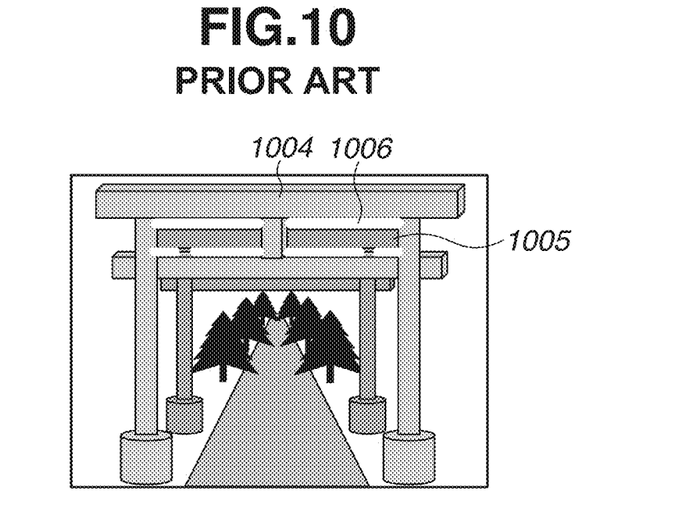
FIG. 10 is a diagram for explaining focus stacking processing performed on a plurality of images including a fully blurred image according to a prior art.

FIG. 10 illustrates the result of a conventional technique. In the conventional technique, if the focus stacking is performed, a combined image in which a high-luminance region 1006, which is a blurred, erodes objects 1004 and 1005, which are focused, may be generated as illustrated in FIG. 10.

SUMMARY OF THE DISCLOSURE

According to the aspect of the embodiments, provided is an apparatus, comprising: at least one memory configured to store instructions; and at least one processor in communication with the at least one memory and configured to execute the instructions to: create a combined image by performing combining processing using a plurality of images of an object captured at different focus positions in an optical axis direction; and acquire contrast values of the plurality of images; wherein a depth of field of the combined image is deeper than a depth of field of each of the plurality of images, wherein the at least one processor further executes instructions to calculate a combining ratio used in the combining processing using the contrast values of the plurality of images, and wherein an image in which the object is not in focus among the plurality of images is determined using the contrast values of the plurality of images, and the determined image is not used in the combining processing.

Further, according to the aspect of the embodiments, provided is an apparatus, comprising: a sensor configured to pick up a plurality of images captured at different focus positions in an optical axis direction; at least one memory configured to store instructions; and at least one processor in communication with the at least one memory and configured to execute the instructions to: create a combined image by performing combining processing using the plurality of images; and acquire contrast values of the plurality of images, wherein a depth of field of the combined image is deeper than a depth of field of each of the plurality of images, wherein the at least one processor further executes instructions to calculate a combining ratio used in the combining processing using the contrast values of the plurality of images, and wherein an image in which the object is not in focus among the plurality of images is determined using the contrast values of the plurality of images, and the determined image is not used in the combining processing.

Furthermore, according to the aspect of the embodiments, provided is a method, comprising: creating a combined image by performing combining processing using a plurality of images of an object captured at different focus positions in an optical axis direction; and acquiring contrast values of the plurality of images, wherein a depth of field of the combined image is deeper than a depth of field of each of the plurality of images, wherein in the combining processing, a combining ratio used in the combining processing is calculated using the contrast values for the plurality of images, and wherein in the combining processing, an image in which the object is not in focus among the plurality of images is determined using the contrast values of the plurality of images, and the determined image is not used in the combining processing.

Further, according to the aspect of the embodiments, provided is a non-transitory computer-readable storage medium which stores a program for causing a computer of an image pickup apparatus to execute a method comprising: creating a combined image by performing combining processing using a plurality of images of an object captured at different focus positions in an optical axis direction; and acquiring contrast values of the plurality of images, wherein a depth of field of the combined image is deeper than a depth of field of each of the plurality of images, wherein in the combining processing, a combining ratio used in the combining processing is calculated using the contrast values for the plurality of images, and wherein in the combining processing, an image in which the object is not in focus among the plurality of images is determined using the contrast values of the plurality of images, and the determined image is not used in the combining processing.

Further features of the disclosure will become apparent from the following description of exemplary embodiments with reference to the attached drawings.

DESCRIPTION OF THE EMBODIMENTS

Exemplary embodiments of the disclosure will be described in detail below with reference to the accompanying drawings.

Figure 1:
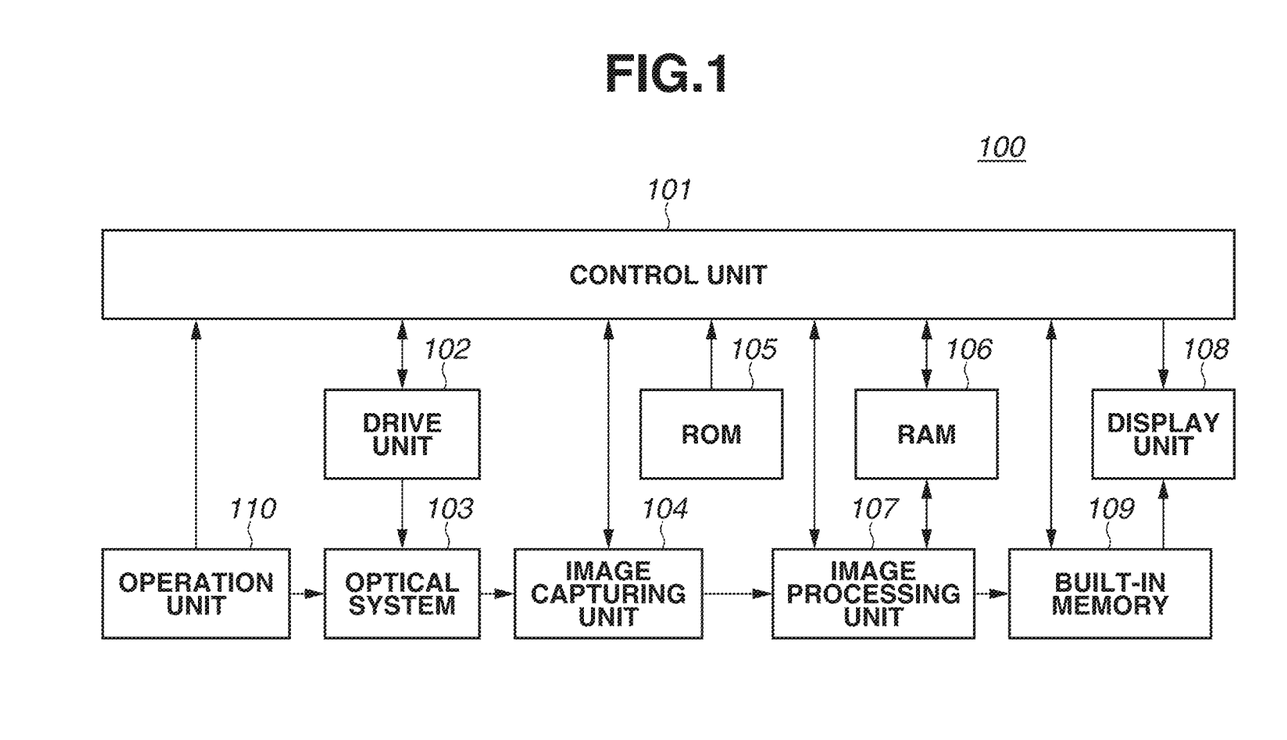
FIG. 1 is a block diagram illustrating a structure of a digital camera according to an exemplary embodiment of the disclosure.

FIG. 1 is an example of a block diagram illustrating a structure of a digital camera used as an image processing apparatus according to an exemplary embodiment of the disclosure. A digital camera 100 can capture a still image, record information indicating an in-focus position, calculate a contrast value, and combine images. Further, the digital camera 100 can perform enlargement processing or reduction processing on an image that has been captured and stored or an image input from the outside of the digital camera 100.

A control unit 101 is a signal processor, such as a central processing unit (CPU) or a micro processing unit (MPU). The control unit 101 controls each unit of the digital camera 100 while reading out a program stored beforehand in a read-only memory (ROM) 105 to be described below. For example, as described below, the control unit 101 issues a command for a start or an end of image capturing to an image capturing unit 104 to be described below, or issues an image processing command to an image processing unit 107 to be described below based on the program stored in the ROM 105. A command issued by a user is input to the digital camera 100 via an operation unit 110 to be described below and reaches each unit of the digital camera 100 via the control unit 101.

A drive unit 102 includes a motor and mechanically operates an optical system 103 to be described below based on a command from the control unit 101. For example, the drive unit 102 moves the position of a focus lens included in the optical system 103 based on a command from the control unit 101 and adjusts the focusing distance of the optical system 103.

The optical system 103 includes a zoom lens, a focus lens, a diaphragm, and the like. The diaphragm is a mechanism for adjusting an amount of transmitted light. The in-focus position can be changed by changing the position of each of the lenses.

The image capturing unit 104 is a photoelectric conversion element that performs photoelectric conversion for converting an input light signal into an electrical signal. For example, a charge-coupled device (CCD) sensor or a complementary metal-oxide semiconductor (CMOS) sensor can be applied to the image capturing unit 104. The image capturing unit 104 has a moving image capturing mode for capturing a plurality of images, which are temporally successive images, as frames of a moving image.

The ROM 105 is a read-only nonvolatile memory used as a recording medium and stores not only an operation program for each block included in the digital camera 100, but also a parameter and the like for operation of each block. A random access memory (RAM) 106 is a rewritable volatile memory and is used as a storage area for temporarily storing data output in operation of each block included in the digital camera 100.

The image processing unit 107 performs various image processes, such as white balance adjustment, color interpolation, and filtering, on an image output from the image capturing unit 104 or image signal data stored in a built-in memory 109 to be described below. Further, the image processing unit 107 performs compression processing on image signal data of an image captured by the image capturing unit 104 based on a standard such as Joint Photographic Experts Group (JPEG).

The image processing unit 107 includes an application specific integrated circuit (ASIC) in which circuits for performing specific processing are integrated. Alternatively, the control unit 101 may implement some or all of functions of the image processing unit 107 by performing processing based on the program read out from the ROM 105. In a case where the control unit 101 implements all of the functions of the image processing unit 107, there is no need to include the image processing unit 107 as a hardware module.

A display unit 108 is, for example, a liquid crystal display or an organic electroluminescence (EL) display that displays an image temporarily stored in the RAM 106, an image stored in the built-in memory 109 to be described below, or a setting screen for the digital camera 100.

The built-in memory 109 is an area where an image captured by the image capturing unit 104, an image obtained through processing performed by the image processing unit 107, and information about the in-focus position set during image capturing are recorded. A memory card or the like may be used instead of the built-in memory 109.

Examples of the operation unit 110 include a button, a switch, a key, and a mode dial that are provided on the digital camera 100, and a touch panel functioning as the display unit 108. A command issued by the user reaches the control unit 101 via the operation unit 110.

Figure 2:
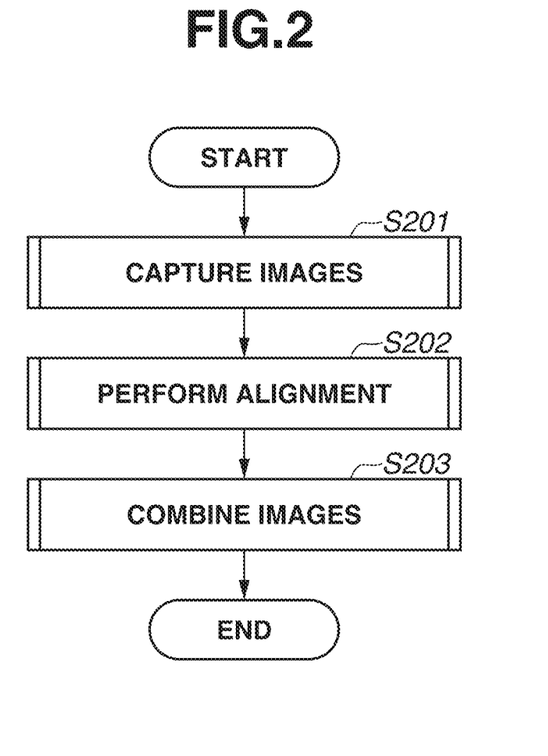
FIG. 2 is a flowchart illustrating combined image generation processing according to the exemplary embodiment of the disclosure.

FIG. 2 is a flowchart illustrating combined image generation processing according to the present exemplary embodiment. In step S201, the image capturing unit 104 captures a plurality of images at different focus positions. In step S202, the control unit 101 performs alignment processing on the plurality of images captured by the image capturing unit 104 in step S201. In step S203, the image processing unit 107 combines the images subjected to the alignment processing to generate a combined image with a deeper depth of field. Each step of the processing will be described in detail below.

Figure 3:
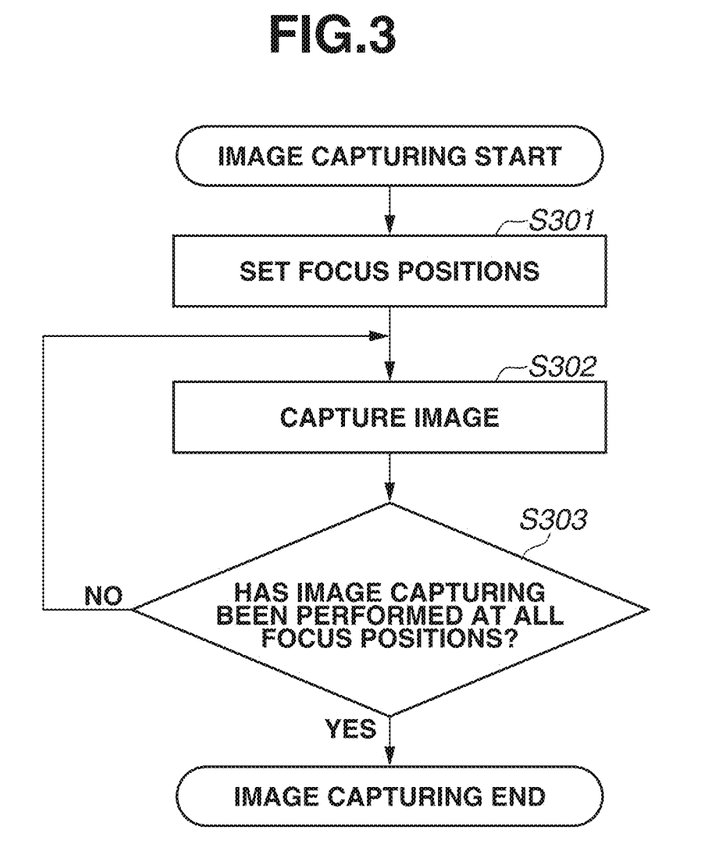
FIG. 3 is a flowchart illustrating image capturing processing according to the exemplary embodiment of the disclosure.

FIG. 3 is a flowchart illustrating the image capturing processing in step S201 according to the present exemplary embodiment.

In step S301, the control unit 101 sets focus positions. For example, the user designates an in-focus position via the touch panel functioning as the display unit 108, and designates the plurality of focus positions at regular intervals on the near side and on the infinite side of a focus position corresponding to the designated in-focus position in an optical axis direction. At the same time, the control unit 101 determines order of image capturing among the set focus positions in order of distance.

In step S302, the image capturing unit 104 captures an image at a focus position that is the first in the order of image capturing among the focus positions set in step S301 at which an image is yet to be captured.

In step S303, the control unit 101 determines whether image capturing has been performed at all the focus positions set in step S301. If the image capturing has been performed at all the focus positions (YES in step S303), the processing in the flowchart ends. If there is any focus position at which the image capturing has not been performed yet (NO in step S303), the processing returns to step S302.

In the case of using a multiple camera including a plurality of image capturing units 104, image capturing at the plurality of focus positions set in step S301 can be carried out simultaneously.

Figure 4:
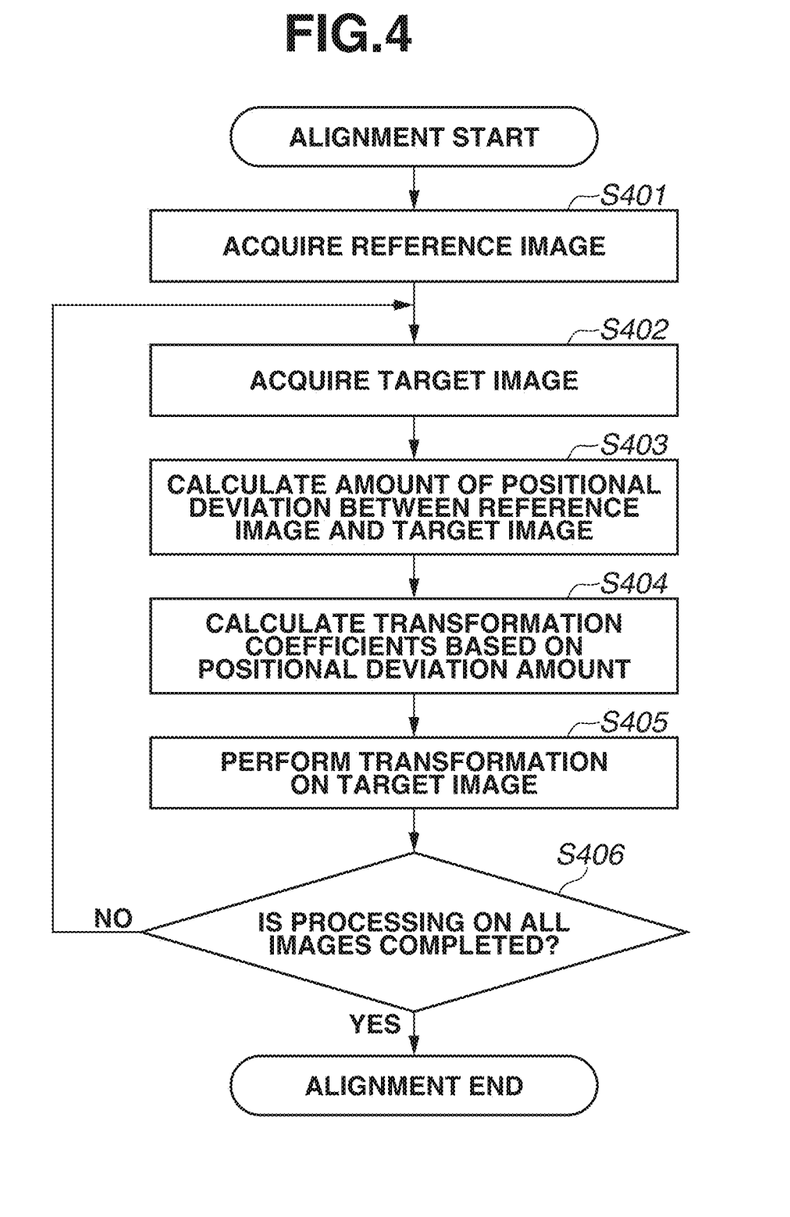
FIG. 4 is a flowchart illustrating alignment processing according to the exemplary embodiment of the disclosure.

FIG. 4 is a flowchart illustrating the alignment processing in step S202 according to the present exemplary embodiment.

In step S401, the control unit 101 acquires a reference image for the alignment processing from among the images captured by the image capturing unit 104 in step S201. For example, an image that is captured the first in the order of image capturing may be used as the reference image for the alignment processing. Alternatively, an image with the smallest angle of view among the captured images may be used as the reference image for the alignment processing because the angle of view slightly changes between images captured while changing the focus position.

In step S402, the control unit 101 acquires a target image for the alignment processing. The target image is an image other than the reference image acquired in step S401 and on which the alignment processing has not been performed yet. If the image that is captured the first in the order of image capturing is used as the reference image, the control unit 101 may sequentially acquire the target images in the order of image capturing.

In step S403, the control unit 101 calculates an amount of positional deviation between the reference image and the target image. An example of the calculation method is described below. First, the control unit 101 sets a plurality of blocks in the reference image. The control unit 101 may be set the blocks with the same size. Next, the control unit 101 sets a search range in the target image at the same position as a position of each of the blocks in the reference image. The search range is larger than each of the blocks in the reference image. Lastly, the control unit 101 calculates a corresponding point in each search range of the target image at which a sum of absolute difference (hereinafter referred to as SAD) of luminance with respect to each of the blocks of the reference image is a minimum. The control unit 101 calculates the positional deviation obtained in step S403 as a vector based on the center of each block of the reference image and the above-described corresponding point. The control unit 101 may use a sum of squared difference (hereinafter referred to as SSD), a normalized cross correlation (hereinafter referred to as NCC), or the like in addition to the SAD in the calculation of the corresponding point described above.

In step S404, the control unit 101 calculates transformation coefficients based on the amount of positional deviation between the reference image and the target image. The control unit 101 uses, for example, projective transformation coefficients as the transformation coefficients. However, the transformation coefficients are not limited to the projective transformation coefficients, but instead affine transformation coefficients or simplified transformation coefficients based on horizontal and vertical shift may be used.

In step S405, the image processing unit 107 performs transformation on the target image using the transformation coefficients calculated in step S404.

For example, the control unit 101 can perform the transformation using Formula (1).

$$I' = \begin{pmatrix} x' \\ y' \\ 1 \end{pmatrix} = AI = \begin{pmatrix} a & b & c \\ d & e & f \\ g & h & i \end{pmatrix} \begin{pmatrix} x \\ y \\ 1 \end{pmatrix} \quad (1)$$

In Formula (1), (x', y') represents coordinates after the transformation is performed, and (x, y) represents coordinates before the transformation is performed. A matrix A represents the transformation coefficients calculated by the control unit 101 in step S404.

In step S406, the control unit 101 determines whether the alignment processing has been performed on all the images other than the reference image. If the alignment processing has been performed on all the images other than the reference image (YES in step S406), the processing in the flowchart ends. If there is any image on which the alignment processing has not been performed yet (NO in step S406), the processing returns to step S402.

In the case of performing the alignment processing on a plurality of images captured by the above-described multiple camera, an amount of parallax caused due to a difference in the positions of the optical systems 103 can be obtained by calculating the amount of positional deviation in step S403, and thus the alignment processing can be performed by processing similar to that described above.

Figure 5:
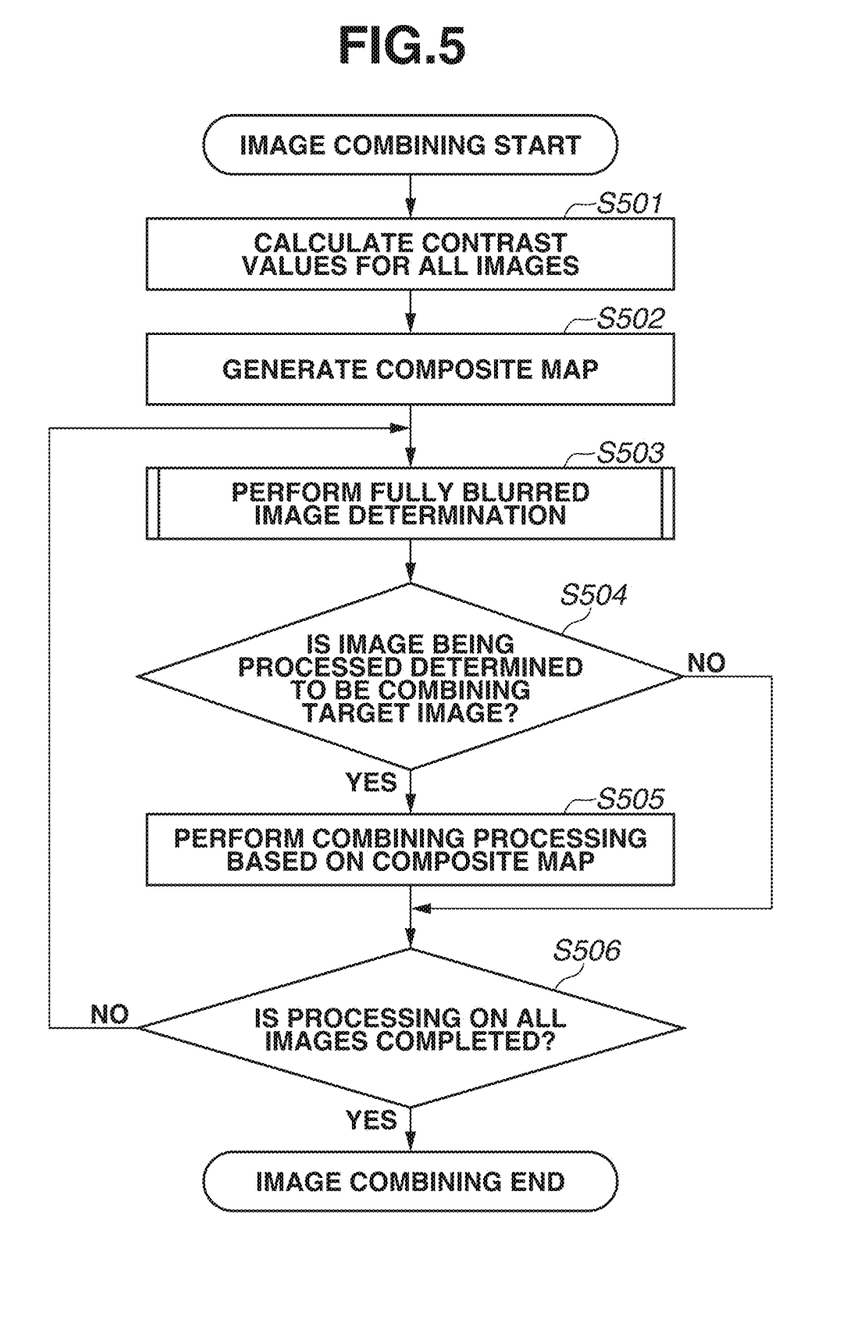
FIG. 5 is a flowchart illustrating image combining processing according to the exemplary embodiment of the disclosure.

FIG. 5 is a flowchart illustrating the image combining processing in step S203 according to the present exemplary embodiment.

In step S501, the image processing unit 107 calculates a contrast value for each of the images (including the reference image) undergone the alignment processing is performed. As a method for calculating the contrast value, for example, the image processing unit 107 first calculates a luminance Y using Formula (2) based on color signals Sr, Sg, and Sb of each pixel.

$$Y = 0.299\ Sr + 0.587\ Sg + 0.114\ Sb \quad (2)$$

Next, a contrast value I is calculated using a Sobel filter for a 3×3 matrix L of the luminance Y of a pixel as expressed by Formulas (3) to (5) described below.

$$I_h = \begin{pmatrix} -1 & 0 & 1 \\ -2 & 0 & 2 \\ -1 & 0 & 1 \end{pmatrix} \cdot L \quad (3)$$

$$I_v = \begin{pmatrix} -1 & -2 & -1 \\ 0 & 0 & 0 \\ 1 & 2 & 1 \end{pmatrix} \cdot L \quad (4)$$

$$I = \sqrt{I_h^2 + I_v^2} \quad (5)$$

The above-described method for calculating the contrast value is merely an example, and other types of filters can be used. Examples of other types of filters include an edge-detection filter, such as a Laplacian filter, and a band-pass filter that passes frequencies in a predetermined bandwidth.

In step S502, the image processing unit 107 generates a composite map. As a method for generating the composite map, the image processing unit 107 compares contrast values of pixels located at the same position in respective images, and calculates a combining ratio depending on the magnitude of each contrast value. Specifically, among the pixels located at the same position, a combining ratio of 100% is provided to a pixel with the largest contrast value, and a combining ratio of 0% is provided to other pixels located at the same position. In other words, Formula (6) is satisfied.

$$A_m(x, y) = \max_{k=1} C_k(x, y) \qquad (6)$$

In Formula (6), $C_k(x, y)$ represents the contrast value calculated in step S501, and $A_m(x, y)$ represents the ratio of the composite map. In Formula (6), m represents an mth image among the plurality of images captured at the different focus positions, x represents a horizontal coordinate of the image, and y represents a vertical coordinate of the image.

In step S502, the combining ratio is to be adjusted as appropriate so that a boundary portion appears natural. As a result, the combining ratio of the composite map for one image is not changed between two values, i.e., 0% and 100%, but is continuously changed.

In step S503, the image processing unit 107 performs fully blurred image determination processing on one of the captured images using the composite map generated in step S502. A specific method for the fully blurred image determination processing will be described later.

In step S504, the image processing unit 107 determines whether the image being processed is a combining target image used in image combining processing based on the result of determination in step S503. The image processing unit 107 determines that an image that is not determined to be a fully blurred image in step S503 (an image for which a combining target flag to be described below is on) is the combining target image. If the image is determined to be the combining target image (YES in step S504), the processing proceeds to step S505. In step S505, the combining processing is performed based on the composite map generated in step S502, and then the processing proceeds to step S506. On the other hand, if the image is not determined to be the combining target image (NO in step S504), the processing proceeds to step S506 without performing the combining processing.

In step S506, if the processing is performed on all images (YES in step S506), the processing in the flowchart illustrated in FIG. 5 ends. If there is any image on which the processing is not performed (NO in step S506), the processing returns to step S503.

As described above, in the image that is determined to be the fully blurred image in step S503, no object is in focus, and thus, in the composite map generated in step S502, the combining ratio of 0% is to be provided to all pixels of the fully blurred image. However, in the case of a scene with strong backlight as illustrated in FIG. 7D, a combining ratio other than 0% may be erroneously provided to a part of the fully blurred image based on some algorithms of related art. Accordingly, in the present exemplary embodiment, steps S503 and S504 are provided to eliminate the fully blurred image from the combining target.

The fully blurred image determination processing in step S503 will be described in detail below with reference to FIGS. 6 to 9.

Figure 6:
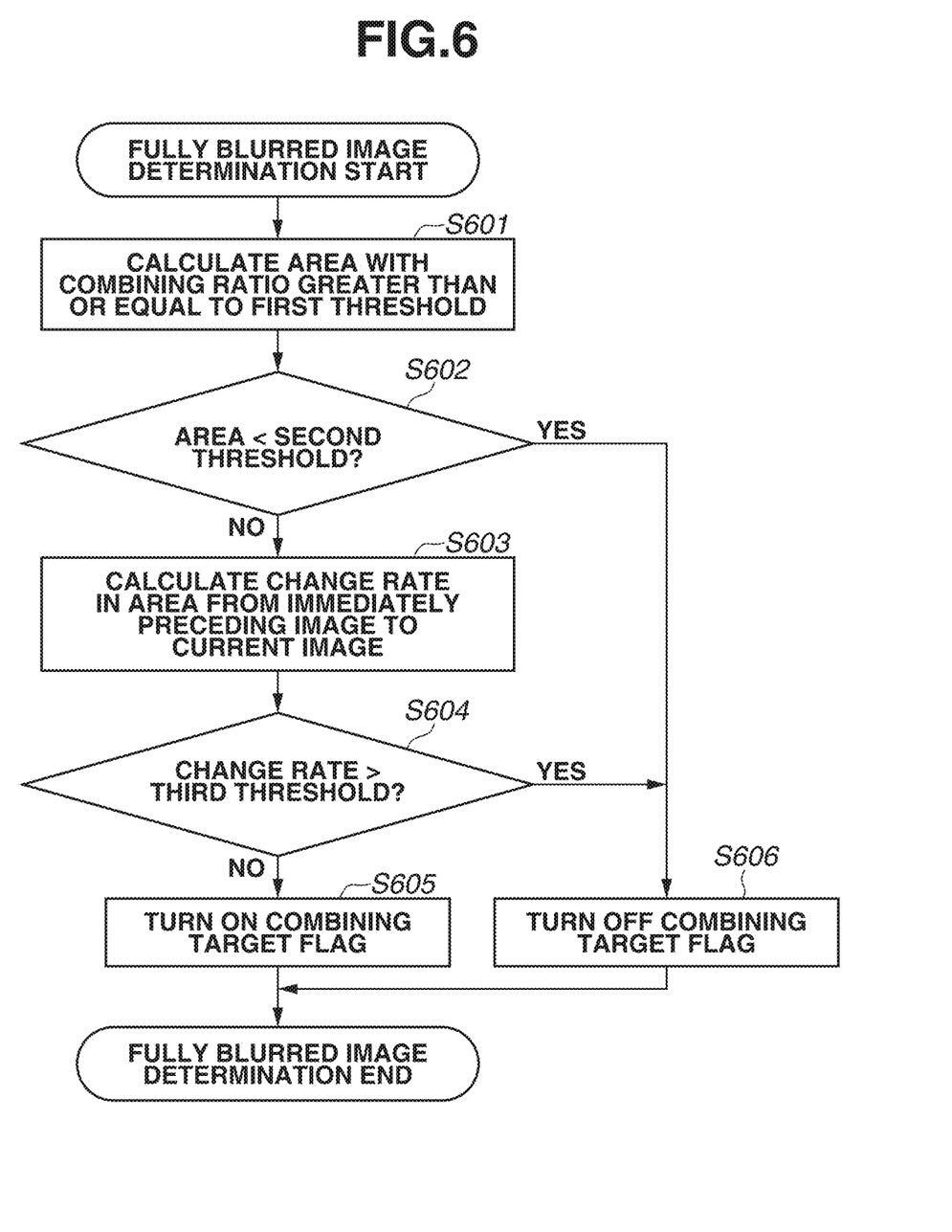
FIG. 6 is a flowchart illustrating fully blurred image determination processing according to the exemplary embodiment of the disclosure.

FIG. 6 is a flowchart illustrating the fully blurred image determination processing in step S503 according to the present exemplary embodiment.

Figure 7A:
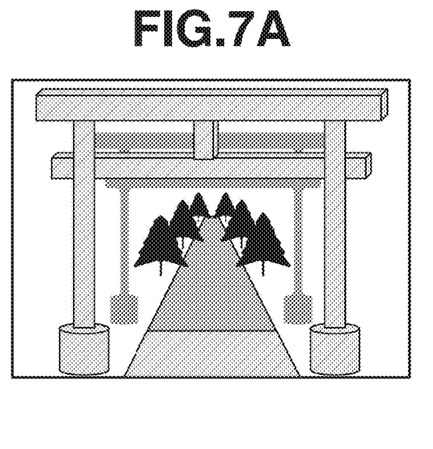
FIGS. 7A to 7E are diagrams for explaining focus stacking processing performed on a plurality of images including a fully blurred image.
Figure 7B:
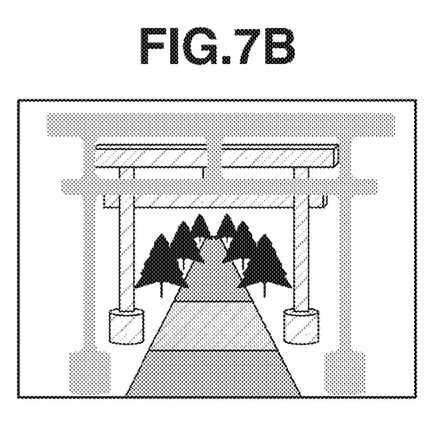
Figure 7C:
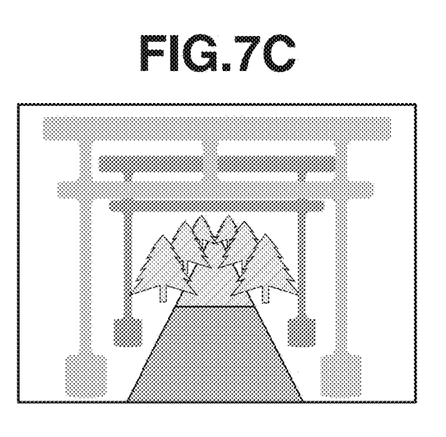
Figure 7D:
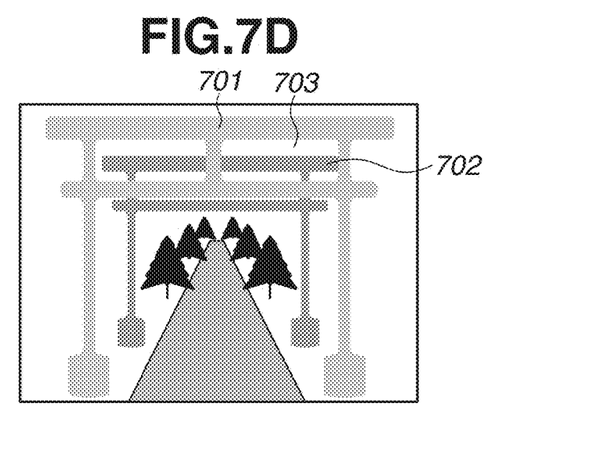
Figure 7E:
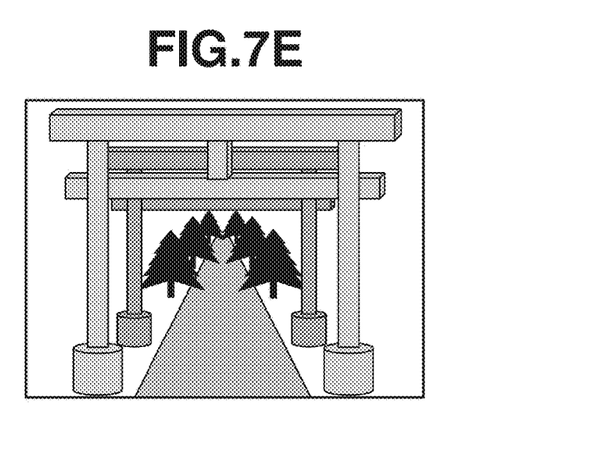
Figure 8A:
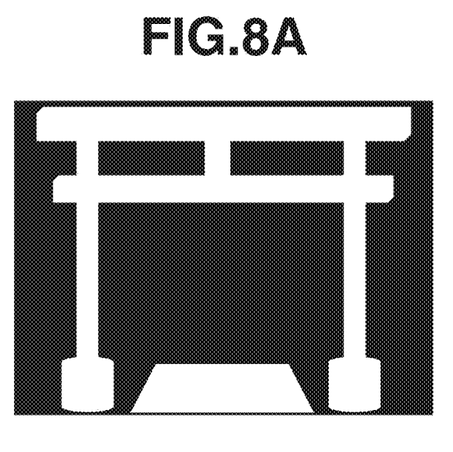
FIGS. 8A to 8D each illustrates a composite map according to the exemplary embodiment of the disclosure.
Figure 8B:
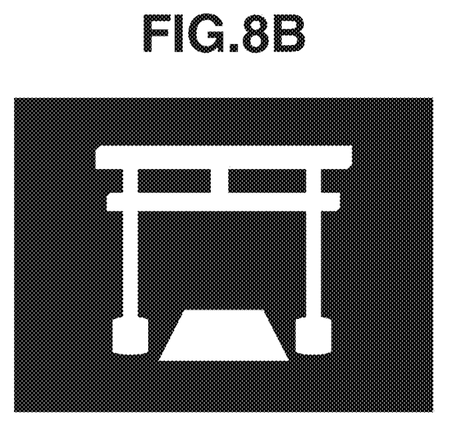
Figure 8C:
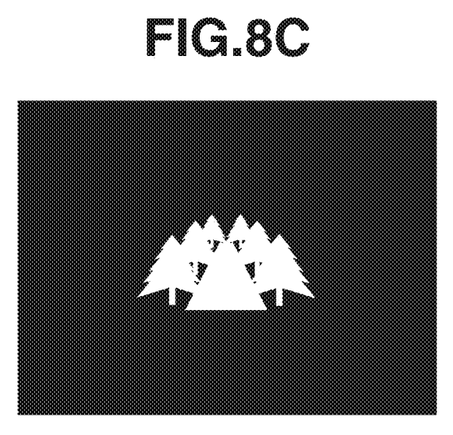
Figure 8D:
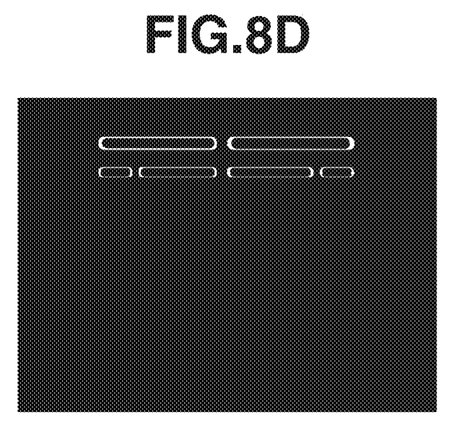

FIGS. 7A to 7E are diagrams for explaining the focus stacking using a plurality of images including a fully blurred image. FIGS. 7A to 7D illustrate images captured by sequentially changing focus positions from a closest distance side to an infinite distance side. A shaded region in each of FIGS. 7A to 7C represents an in-focus region in each image. FIG. 7D illustrates an image that is captured at a focus position at an infinite distance and in which no object is in focus. In other words, FIG. 7D illustrates a fully blurred image including no in-focus region. FIG. 7E illustrates an ideal combined image when the focus stacking is performed on the images illustrated in FIGS. 7A to 7D. However, for example, in the case of a scene with strong backlight, a boundary portion between a high-luminance region 703 and objects 701 and 702 has a high contrast even in the fully blurred image illustrated in FIG. 7D. FIGS. 8A to 8D each illustrates the composite map according to the present exemplary embodiment. The composite maps shown in FIGS. 8A to 8D respectively correspond to the images illustrated in FIGS. 7A to 7D. A white region in each composite map represents a region with a high combining ratio, and a black region represents a region with a small combining ratio. In FIGS. 8A to 8D, the composite maps are represented by binary values for convenience of explanation. However, the level of a value representing the combining ratio for each pixel is not actually limited.

In step S601, an area with a combining ratio greater than or equal to a preliminarily set first threshold is calculated based on the composite map generated in step S502. For example, the number of pixels greater than or equal to the first threshold may be calculated for each of the composite maps illustrated in FIGS. 8A to 8D, or a ratio normalized with the number of pixels of the entire image may be calculated.

Figure 9:
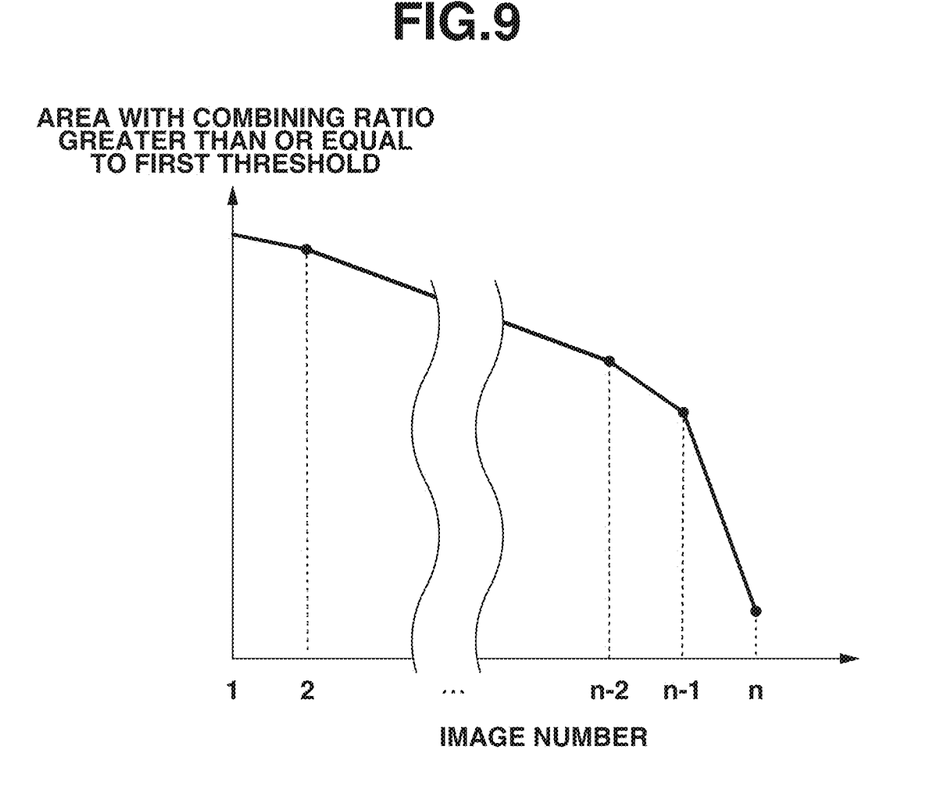
FIG. 9 is a graph illustrating an area with a combining ratio that is greater than or equal to a first threshold in the composite map according to the exemplary embodiment of the disclosure.

FIG. 9 is a graph illustrating the area with the combining ratio greater than or equal to the first threshold in the composite map according to the present exemplary embodiment. FIG. 9 is a graph in which the vertical axis represents an area with the combining ratio greater than or equal to the first threshold and the horizontal axis represents an image number. FIG. 9 illustrates a state where the area changes as a distance from the digital camera 100 increases. A smaller image number indicates that an image is captured at a position closer to the closest distance end, and a larger image number indicates that an image is captured at a position closer to the infinite distance end.

In step S602, it is determined whether the area calculated in step S60 is smaller than a preliminarily set second threshold. If the area calculated in step S601 is smaller than the second threshold (YES in step S602), the image is determined to be a fully blurred image and the combining target flag is turned off. On the other hand, if the area is larger than or equal to the second threshold (NO in step S602), the processing proceeds to step S603. The second threshold described herein may be dynamically changed. For example, depending on the focus position set in step S301, the second threshold may be decreased stepwise or continuously toward the closest distance end, or may be decreased stepwise or continuously as a distance between the focus positions decreases. Further, the second threshold may be decreased stepwise or continuously as an aperture value used in the image capturing processing in step S302 decreases.

In order to perform the fully blurred image determination processing more accurately, a change in the parameter between images is used in the fully blurred image determination processing according to the present exemplary embodiment. For example, a case is assumed where, among n images captured at different focus positions, the first to (n−1)th images are images each including an in-focus region, and the nth image is a fully blurred image including no in-focus region. In this case, with respect to the area calculated in step S601, the area of the nth image, which is the fully blurred image, rapidly decreases compared to the area of the (n−1)th image as illustrated in FIG. 9. By focusing on such a change, in step S603, a change rate R from an immediately preceding image to a current image in terms of the area calculated in step S601 is calculated. The change rate R described herein is expressed by Formula (7), where $S_{n-1}$ represents the area of the immediately preceding image and $S_n$ represents the area of the current image.

$$R = \frac{S_{n-1} - S_n}{S_{n-1}} \times 100\% \qquad (7)$$

In step S604, it is determined whether the change rate R expressed by Formula (7) calculated in step S603 is greater than a third threshold. If the change rate R calculated in step S603 is greater than the third threshold (YES in step S604), the processing proceeds to step S606. In step S606, the combining target flag is turned off. If the change rate R is smaller than or equal to the third threshold (NO in step S604), the processing proceeds to step S605. In step S605, the combining target flag is turned on. The third threshold described herein may be dynamically changed and, for example, may be decreased if a difference between the focus positions of the images is small.

If there is any image of which the combining target flag is turned off in step S606, an image captured at a position on the infinite distance side of the focus position of the image may also be determined to be the fully blurred image, and the combining target flag thereof may be turned off. Further, with regard to an image, an area of which calculated in step S601 is larger than or equal to a fourth threshold, among images captured at positions on the infinite distance side of the focus position of the image, the combining target flag thereof may be turned on so that it is possible to handle a scene including a plurality of objects present at different distances from the digital camera 100. Similar to the second threshold described above, the fourth threshold described herein may be dynamically changed. Depending on the focus position set in step S301, the fourth threshold may be decreased as the focus position is closer to the digital camera 100, or may be decreased as the focus positions of the images are closer to each other. Further, the fourth threshold may be decreased as the aperture value used in the image capturing processing in step S302 decreases.

Thus, the fully blurred image determination processing in step S503 is completed.

According to the present exemplary embodiment, the area of each pixel with the combining ratio greater than or equal to the first threshold in the generated composite map is calculated, and the image is determined to be the fully blurred image if the area is smaller than or equal to the second threshold, or if the change rate from the previous frame is greater than or equal to the third threshold. In addition, the fully blurred image is removed from the combining target images, so that deterioration in image quality due to the fully blurred image being combined can be prevented.

The exemplary embodiments described above are carried out using a digital camera, but are not limited to using the digital camera. For example, the exemplary embodiments may be carried out using a portable device incorporating an image sensor or a network camera capable of capturing images.

According to the exemplary embodiments described above, a fully blurred image among a plurality of images captured at different focus positions is determined, and the fully blurred image is removed from the combining target images, so that the deterioration in image quality of a focus-stacked image can be prevented.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-228213, filed on Dec. 18, 2019 which is hereby incorporated by reference herein in its entirety.

What is claimed is:
1. An apparatus, comprising:
at least one memory configured to store instructions; and
at least one processor in communication with the at least one memory and configured to execute the instructions to:

create a combined image by performing combining processing using a plurality of images of an object captured at different focus positions in an optical axis direction; and acquire contrast values of the plurality of images;

wherein a depth of field of the combined image is deeper than a depth of field of each of the plurality of images, wherein the at least one processor further executes instructions to calculate a combining ratio used in the combining processing using the contrast values of the plurality of images, and wherein an image in which the object is not in focus among the plurality of images is determined using the contrast values of the plurality of images, and the determined image is not used in the combining processing.

2. The apparatus according to claim 1, wherein the at least one processor further executes instructions to compare the contrast values of corresponding regions in the plurality of images and provide a higher combining ratio to a region with a higher contrast value.

3. The apparatus according to claim 2, wherein the corresponding regions are regions located at a same position of the plurality of images after the plurality of images are subjected to alignment processing.

4. The apparatus according to claim 1, wherein an in-focus region of each of the plurality of images is cut out and is used in the combining processing.

5. The apparatus according to claim 4, wherein the in-focus region is determined using the contrast values of the plurality of images.

6. The apparatus according to claim 1, wherein in a case where an area with the combining ratio greater than or equal to a first threshold in a first image among the plurality of images is smaller than a second threshold, or in a case where a change in the area between the first image and a second image being a frame adjacent to the first image is greater than a third threshold, the at least one processor further executes instructions to determine the first image to be the image in which the object is not in focus.

7. The apparatus according to claim 6, wherein in a case where an aperture value for capturing the plurality of images is a second aperture value smaller than a first aperture value, the second threshold is smaller than in a case where the aperture value is the first aperture value.

8. The apparatus according to claim 6, wherein in a case where each of the focus positions of the plurality of images is a second position closer to a closest distance end than a first position, the second threshold is smaller than in a case where each of the focus positions of the plurality of images is the first position.

9. The apparatus according to claim 6, wherein in a case where an interval between the focus positions of the plurality of images is a second interval smaller than a first interval, the second threshold is smaller than in a case where the interval between the focus positions of the plurality of images is the first interval.

10. The apparatus according to claim 6, wherein the change in the area is a ratio of a difference in the area.

11. The apparatus according to claim 6, wherein in a case where an interval between the focus positions of the plurality of images is a second interval smaller than a first interval, the third threshold is smaller than in a case where the interval between the focus positions of the plurality of images is the first interval.

12. The apparatus according to claim 6, wherein the at least one processor further executes instructions to determine, if any one of the plurality of images is determined to be the image in which the object is not in focus, an image whose focus position is closer to an infinite distance end than the focus position of the image in which the object is not in focus to be the image in which the object is not in focus.

13. The apparatus according to claim 6, wherein the at least one processor further executes instructions to determine, if any one of the plurality of images is determined to be the image in which the object is not in focus, an image whose focus position is closer to an infinite distance end than the focus position of the image in which the object is not in focus and having the area larger than a fourth threshold to be the image in which the object is not in focus.

14. The apparatus according to claim 13, wherein in a case where an aperture value for capturing the plurality of images is a second aperture value smaller than a first aperture value, the fourth threshold is smaller than in a case where the aperture value is the first aperture value.

15. The apparatus according to claim 13, wherein in a case where each of the focus positions of the plurality of images is a second position closer to a closest distance end than a first position, the fourth threshold is smaller than in a case where each of the focus positions of the plurality of images is the first position.

16. The apparatus according to claim 13, wherein in a case where an interval between the focus positions of the plurality of images is a second interval smaller than a first interval, the fourth threshold is smaller than in a case where the interval between the focus positions of the plurality of images is the first interval.

17. An apparatus, comprising:

a sensor configured to pick up a plurality of images captured at different focus positions in an optical axis direction;

at least one memory configured to store instructions; and at least one processor in communication with the at least one memory and configured to execute the instructions to:

create a combined image by performing combining processing using the plurality of images; and acquire contrast values of the plurality of images, wherein a depth of field of the combined image is deeper than a depth of field of each of the plurality of images, wherein the at least one processor further executes instructions to calculate a combining ratio used in the combining processing using the contrast values of the plurality of images, and wherein an image in which the object is not in focus among the plurality of images is determined using the contrast values of the plurality of images, and the determined image is not used in the combining processing.

18. A method, comprising:

creating a combined image by performing combining processing using a plurality of images of an object captured at different focus positions in an optical axis direction; and acquiring contrast values of the plurality of images, wherein a depth of field of the combined image is deeper than a depth of field of each of the plurality of images, wherein in the combining processing, a combining ratio used in the combining processing is calculated using the contrast values for the plurality of images, and wherein in the combining processing, an image in which the object is not in focus among the plurality of images is determined using the contrast values of the plurality of images, and the determined image is not used in the combining processing.

19. A non-transitory computer-readable storage medium which stores a program for causing a computer of an image pickup apparatus to execute a method comprising:
creating a combined image by performing combining processing using a plurality of images of an object captured at different focus positions in an optical axis direction; and
acquiring contrast values of the plurality of images,
wherein a depth of field of the combined image is deeper than a depth of field of each of the plurality of images,
wherein in the combining processing, a combining ratio used in the combining processing is calculated using the contrast values for the plurality of images, and
wherein in the combining processing, an image in which the object is not in focus among the plurality of images is determined using the contrast values of the plurality of images, and the determined image is not used in the combining processing.

* * * * *